May 24, 1960

H. P. GUIRL ET AL 2,937,601

TROLLEY CONVEYOR

Filed March 26, 1958

INVENTORS
HOWARD P. GUIRL AND
JAMES N. GUIRL
BY *Cohn and Powell*
ATTORNEYS

United States Patent Office 2,937,601
Patented May 24, 1960

2,937,601

TROLLEY CONVEYOR

Howard P. Guirl and James N. Guirl, both of 911 Craig Drive, Kirkwood 22, Mo.

Filed Mar. 26, 1958, Ser. No. 724,024

7 Claims. (Cl. 105—155)

This invention relates generally to improvements in a trolley for a conveyor system, and more particularly to an improved trolley adapted for use in a conveyor system of the kind in which a continuously connected system of parts travels within a tubular or box-shaped track.

It is an important object of the present invention to provide the trolley with improved anti-friction means allowing travel of the trolley around horizontal and vertical turns in the track path. Other advantages are realized by the provision of an improved connection for a load-carrying member to the trolley.

Another important object is achieved by the structural arrangement and connection of a pair of spaced, parallel ball races with a third ball race extending between and laterally outwardly of such parallel races to provide a trolley capable of engaging the top, bottom and opposite sides of a track with minimal frictional effects.

Yet another important object is realized by improved clips detachably interconnecting the parallel ball races, the clips retaining the ball races in assembly and providing means for connecting linkage elements between adjacent trolleys.

Still another important object is achieved by the novel structural arrangement of the component parts of the trolley which enables the trolley to be quickly and easily assembled and as readily disassembled without the use of any special tools.

Another important objective is realized by providing a trolley in which the horizontal load-supporting means, the vertical load-supporting means and the load-connecting means, all have a common center.

Other important advantages are realized by the improved connection of a load pendant bar to the web of a horizontally disposed ball race. Another important object is achieved by the improved structure of a U-shaped clip adapted to receive and retain a pin on which the chain interconnecting adjacent trolleys is attached.

Other important advantages are afforded by the relation of the spaced parallel ball races to the clips and the pins retained therein to preclude unintentional detachment of the chain.

Another important objective is to realize a trolley that is simple and durable in construction, economical to manufacture and assemble, efficient in operation, and one which can be readily disassembled at the situs for changes in parts or in connection.

The foregoing and numerous other objects and advantages of the invention will more clearly appear from the following detailed description of a preferred embodiment, particularly when considered in connection with the accompanying drawings, in which.

Figure 3:
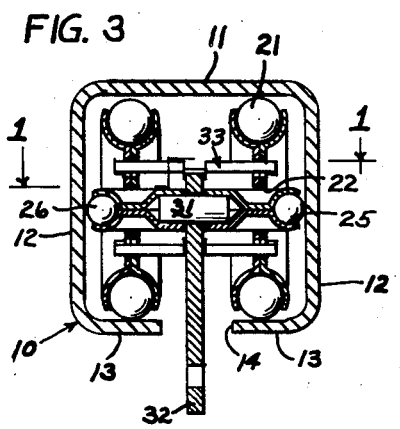
Fig. 3 is a cross sectional view of the trolley and track as seen along line 3—3 of Fig. 2.

The track generally indicated at 10 in which the trolley is located and carried is of substantially box-shape in cross-section as is clearly shown in Fig. 3. The track 10 includes an upper wall 11, opposed side walls 12 and in-turned bottom walls 13 separated by a longitudinal slot 14 extending the length of the track.

The trolley includes a pair of oval ball races 15 and 16 arranged in spaced parallel relation. Each oval ball race 15—16 is formed of a pair of identical stampings arranged and secured together in face-to-face relation to provide a web 17 and a peripheral groove 20.

Located and retained within the peripheral groove 20 of each oval ball race 15—16 are a plurality of ball bearings 21. The ball bearings 21 extend outwardly of peripheral grooves 20 to engage coacting track portions. More particularly it will be seen that when oval ball races 15—16 are located within the track 10, the lower flights engage the bottom track walls 13.

Formed in web 17 of oval ball races 15—16 are aligned slots 22 extending longitudinally of races 15—16. A third ball race 23, of substantially square configuration, is positioned between and at right angles to the parallel ball races 15—16, the third ball race 23 being received and positioned by web slots 22.

Figure 1:
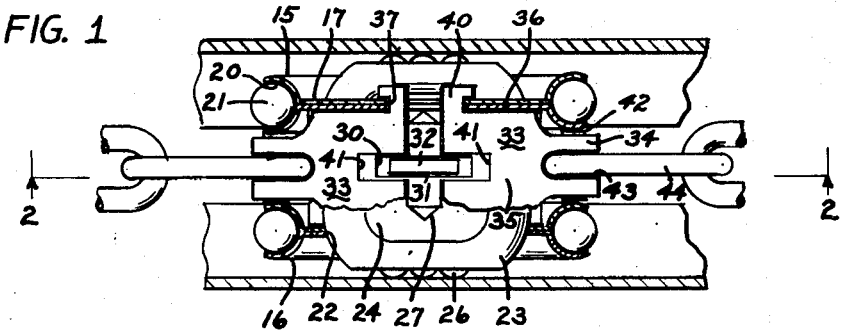
Fig. 1 is a fragmentary top plan view of the trolley and track, partly in cross section, as seen along staggered line 1—1 of Fig. 3.
Figure 2:
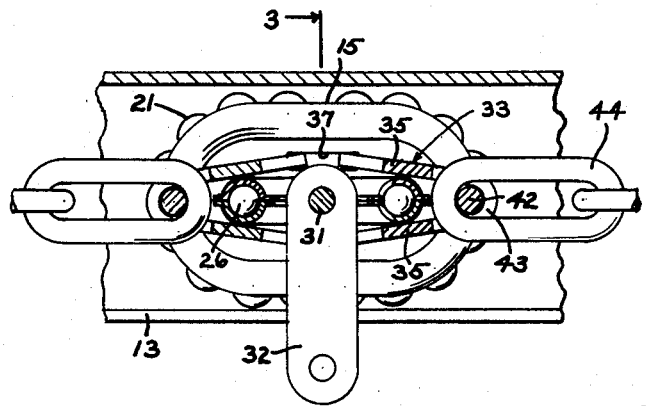
Fig. 2 is a view of the trolley and track, partly in cross section, as seen along line 2—2 of Fig. 1.

The third ball race 23 is formed by a pair of identical stampings secured together in face-to-face relation to form a web 24 and a peripheral groove 25. A plurality of ball bearings 26 are located within the peripheral groove 25. As is best seen in Figs. 1 and 2, the ball bearings 26 are substantially enclosed within the ball race 23 except the opposite sides of the trolley which are open to permit the ball bearings 26 to engage the lateral track walls 12.

A pocket 27 is formed centrally of the web 24 of ball race 23, the pocket 27 being substantially cylindrical with conical ends, and being formed along the transverse axis of the trolley. The ball race web 24 is provided with an elongate slot 30 extending through the pocket 27 and extending along the longitudinal axis of the trolley.

Carried within pocket 27 is a pin 31 that bridges the elongate slot 30. A pendant bar 32 extends through elongate slot 30 and is pivotally carried by pin 31. The bar 32 depends centrally through the longitudinal slot 14 formed in the bottom track wall. The load is attached by any conventional means to the pendant bar 32 for movement along the conveyor system.

Figure 4:
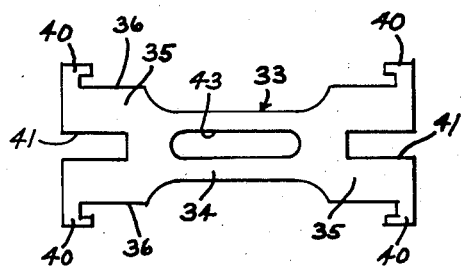
Fig. 4 is a plan view of the clip connector as formed from sheet material.

A pair of clip connectors 33 is utilized to connect and retain detachably the ball races 15—16 and 23 in assembly. The clips 33 are of identical construction, and a detailed description of one will serve the other. Fig. 4 illustrates a layout of the clip 33 before it is folded to a U-shape, and the particular structure of the clip is perhaps best shown in this view.

The U-shaped clip 33 includes a bight portion 34 and integral arms 35. Each arm portion 35 includes lateral shoulders 36 adapted to engage the webs 17 of oval ball races 15—16.

Formed in webs 17 of oval ball races 15—16 is a pair of elongate slots 37, one such slot 37 being located above and one below the centrally located ball race 23. The free end of arm portions 35 are provided with hooks 40 at each side of the clip 33. The hooks 40 provide abutments adapted to engage the end of slot 37 when under tension as will be explained subsequently.

When assembled, the clip connectors 33 are located between the oval ball races 15—16 in embracing relation to the ball race 23, one clip 33 being located at each end of the trolley. When connected, the hooks 40 are received in slots 37, and the shoulders 36 engage the oval ball races 15—16. The clip arm ends are provided with recesses 41 centrally along the longitudinal axis of the trolley through which the pendant bar 32 projects.

A pin 42 is carried in the bight portion 34 of each clip connector 33. The pin 42 extends between and engages the oval ball races 15—16 to preclude unintentional detachment from the clip 33. The bight portion 34 is provided with a slot 43 along the longitudinal axis of the trolley adapted to receive a chain link 44, the pin 42 fastening the chain link 44 to the clip 33.

The component parts of the trolley are arranged in symmetrical relation about the longitudinal and the transverse axes. The trolley will roll freely when loaded either by a pendant load or by chain tension when passing around curves of relatively small radius in any direction. With this structural arrangement, the vertical load-supporting means provided by oval ball races 15—16, the horizontal load-supporting means represented by ball race 23, and the load-connecting means represented by pin 31 and bar 32, all share a common center.

If it is desired to shorten the distance between trolleys in the conveyor system, the clips 33 may be readily detached from the trolley to enable removal or addition of chain links 44.

It is seen that the clip connectors 33 retain the oval ball races 15—16 in spaced parallel relation, retain the ball race 23 in fixed centered position with the oval ball races, and retain such race 23 in the web slots 22 by reason of the centering action of bar 32 within the slots 30 of the ball race web 24 and by the coacting relation of the bar 32 within the clip recesses 41. Further, the clips 33 serve to attach the chain links between the adjacent trolleys, and serve to retain the pendant bar 32 in centered position.

With this structural arrangement of the clip connectors 33, the trolley can be conveniently disassembled for maintenance, adjustment, or replacement of any part.

Although the invention has been described by making detailed reference to a single preferred embodiment, such detail is to be understood in an instructive, rather than in any restrictive sense, many variants being possible within the scope of the claims hereunto appended.

We claim as our invention:

1. A trolley comprising a pair of ball races having webs and peripheral grooves, and arranged in spaced parallel relation, a third ball race having a web and peripheral groove, the webs of said parallel ball races being provided with aligned slots, the third ball race bridging said parallel ball races and extending through said web slots, balls retained in said grooves and extending outwardly for rolling engagement, means extending between and fastening said parallel ball races, a pin attached to the web of said third ball race, and a pendant bar attached to said pin, the pendant bar engaging the said means to connect the third race to the parallel races and to fix the third race relative to the parallel races.

2. A trolley comprising a pair of ball races each having a web and a peripheral groove, said pair of ball races being arranged in spaced parallel relation, a third ball race having a web and peripheral groove, the webs of said parallel ball races being provided with aligned slots, the third ball race bridging said parallel ball races and extending through said web slots, balls retained in said grooves and extending outwardly for rolling engagement, a pair of substantially U-shaped clips disposed between said parallel ball races and embracing opposed ends of the third ball race, and a detachable connection between the free ends of each clip and the webs of said parallel ball races.

3. The combination and arrangement of elements as recited above in claim 2, in which said clip includes lateral shoulders engaging said webs of the parallel ball races to hold the races in fixed relation on said third race, and by the provision of means attached to the bights of said clips adapted to connect to linkage.

4. The combination and arrangement of elements as recited above in claim 2, in which the said detachable connection consists of hooks provided on the free ends of the clip, and abutments on said webs of said parallel ball races, said hooks engaging said abutments.

5. A trolley comprising a pair of ball races each having a web and a peripheral groove, said pair of ball races being arranged in spaced parallel relation, a third ball race having a web and peripheral groove, the webs of said parallel ball races being provided with aligned slots, the third ball race bridging said parallel ball race, and extending through said web slots, balls retained in said groove of each race and extending outwardly for rolling engagement, a pair of substantially U-shaped clips disposed between said parallel ball races and embracing opposed ends of the third ball race, the webs of each said parallel race being provided with a pair of elongate openings, one above and one below the third ball race, the said openings being defined by end abutments, said clips being provided with hooks on the free ends, said hooks being located selectively in said openings and engaging said end abutments upon exerting an opposed pull on said clips, the clips having lateral shoulders engaging said webs of the parallel ball races to hold the races in fixed relation, and means attached to the bights of said clips adapted to connect to conveyor linkage.

6. A trolley comprising a pair of ball races each having a web and a peripheral groove, said pair of ball races being arranged in spaced parallel relation, a third ball race having a web and peripheral grooves, the webs of said parallel ball races being provided with elongate aligned slots, the third ball race bridging said parallel ball races and extending through said web slots, balls retained in said grooves and extending outwardly for rolling engagement, a pair of substantially U-shaped clips disposed between said parallel ball races and embracing opposed ends of said third ball race, a detachable connection between the free ends of the clips and the webs of said parallel ball races, a pin retained in the bight of the U-shaped clip, and linkage connected to each pin to exert an opposing pull on said clips.

7. A trolley comprising a pair of ball races each having a web and a peripheral groove, said pair of ball races being arranged in spaced parallel relation, a third ball race having a web and peripheral groove, the webs of said parallel ball races being provided with aligned slots, the third ball race bridging said parallel ball races and extending through said web slots, balls retained in said grooves and extending outwardly for rolling engagement, a pair of substantially U-shaped clips embracing opposed ends of the third ball race between said parallel ball races, hooks on said clips, abutments on said webs of said parallel ball races, the hooks engaging said abutments on exerting opposed pulling forces on said clips, the clips having lateral shoulders engaging the webs of said parallel ball races to hold the races in fixed relation, a pin retained in the bight of each U-shaped clip, and an element connected to each pin to exert opposed pulling forces on said clips.

References Cited in the file of this patent
UNITED STATES PATENTS

| | | |
|---|---|---|
| 827,829 | Thomas | Aug. 7, 1906 |
| 1,869,893 | Haddoesay | Aug. 2, 1932 |
| 2,184,860 | Barrett | Dec. 26, 1939 |
| 2,372,199 | Hassler | Mar. 27, 1945 |
| 2,494,009 | Sharp | Jan. 10, 1950 |
| 2,725,973 | King | Dec. 6, 1955 |
| 2,789,685 | Orwin | Apr. 23, 1957 |